United States Patent [19]

Abel et al.

[11] Patent Number: 4,705,526

[45] Date of Patent: Nov. 10, 1987

[54] WATER-SOLUBLE OR WATER-DISPERSIBLE GRAFT POLYMERS AND THE PREPARATION AND USE THEREOF

[75] Inventors: Heinz Abel, Reinach, Switzerland; Paul Schäfer, Oberried, Fed. Rep. of Germany; Hans-Ulrich Berendt, Allschwil, Switzerland

[73] Assignee: Ciba-Geigy Corporation, Ardsley, N.Y.

[21] Appl. No.: 876,034

[22] Filed: Jun. 19, 1986

[30] Foreign Application Priority Data

Jul. 18, 1985 [CH] Switzerland .................. 3120/85

[51] Int. Cl.⁴ .............. C08F 283/01; C08G 63/66; D06P 1/61

[52] U.S. Cl. ................................... 8/555; 8/558; 8/580; 8/582; 8/609; 8/922; 8/924; 8/927; 8/611; 8/648; 8/917; 8/918; 525/445; 528/361

[58] Field of Search ............... 8/555, 580, 582, 609, 8/611, 555, 558, 582, 609; 525/445; 528/361

[56] References Cited

U.S. PATENT DOCUMENTS

| | | | |
|---|---|---|---|
| 4,055,393 | 10/1977 | Schafer et al. | 8/582 |
| 4,259,457 | 3/1981 | Login | 8/115.6 |
| 4,263,337 | 4/1981 | Login | 252/8.6 |
| 4,263,370 | 4/1981 | Login | 8/115.5 |
| 4,273,554 | 6/1981 | Abel | 8/557 |
| 4,277,247 | 7/1981 | Keller et al. | 8/557 |
| 4,343,620 | 8/1982 | Abel et al. | 8/557 |
| 4,389,213 | 6/1983 | Schneider et al. | 8/524 |
| 4,389,214 | 6/1983 | Schafer et al. | 8/527 |
| 4,494,956 | 1/1985 | Schafer et al. | 8/543 |
| 4,612,352 | 9/1986 | Schafer et al. | 525/404 |
| 4,615,837 | 10/1986 | Abel et al. | 8/623 |

FOREIGN PATENT DOCUMENTS 207003 12/1986 European Pat. Off.
52-025183 2/1977 Japan.

*Primary Examiner*—A. Lionel Clingman
*Attorney, Agent, or Firm*—Edward McC. Roberts; Meredith C. Findlay

[57] ABSTRACT

Water-soluble or water-dispersible graft polymers comprising i) as main chain, (1) a condensate of (A) (1) an aliphatic monoalcohol of 6 to 22 carbon atoms or (2) a fatty acid of 8 to 22 carbon atoms with (B) the reaction product of (a) an adduct of propylene adduct with at least trihydric aliphatic alcohol of 3 to 10 carbon atoms, (b) an aliphatic dicarboxylic acid of 4 to 10 carbon atoms, or an anhydride thereof, and (c) an aliphatic diol having an average molecular weight of not more than 1800 and ii) grafted ethylenically unsaturated polymerisable monomers, preferably acrylic acid or acrylamide, in the form of side chains at individual carbon atoms of said condensate.

These graft polymers are particularly suitable for use as anticrease agents for dyeing, whitening, bleaching or washing textile materials, e.g. textiles containing cellulosic fibres, natural or synthetic polyamide fibres, polyacrylonitrile fibres or, in particular, for dyeing or whitening cotton or polyester fibres.

13 Claims, No Drawings

WATER-SOLUBLE OR WATER-DISPERSIBLE GRAFT POLYMERS AND THE PREPARATION AND USE THEREOF

The present invention relates to novel water-soluble or water-dispersible graft polymers, to their preparation and to the use thereof as anticrease agents for textile materials.

The graft polymers of this invention comprise (i) as main chain, a condensate of (A) (1) an aliphatic monoalcohol of 6 to 22 carbon atoms or (2) a fatty acid of 8 to 22 carbon atoms with (B) the reaction product of (a) an adduct of propylene oxide with an at least trihydric aliphatic alcohol of 3 to 10 carbon atoms, (b) an aliphatic dicarboxylic acid of 4 to 10 carbon atoms or the anhydride thereof, and (c) an aliphatic diol having an average molecular weight of not more than 1800, and (ii) grafted ethylenically unsaturated monomers in the form of side chains at individual carbon atoms of said condensate, especially polyalkylene glycol chains.

Depending on the structure of the condensate (main chain) and on the nature of the grafted side chains, the novel graft polymers may be water-soluble or water-dispersible.

Water-soluble graft polymers contain hydrophilic constituents which preferably carry acid water-solubilising groups, e.g. carboxyl groups and/or sulfonic acid groups as well as amide groups.

The condensates employed as main chains are preferably obtained from 2 to 4 moles, preferably 4 moles, of component A(1) or A(2), 1 to 2 moles of component (a), 2 to 8 moles, preferably 3 to 7 moles, of component (b), and 1 to 4 moles, preferably, 1 mole, of component (c).

Suitable aliphatic monoalcohols for use as component A(1) may be natural alcohols, e.g. lauryl alcohol, myristyl alcohol, cetyl alcohol, stearyl alcohol, arachidyl alcohol or behenyl alcohol, as well as synthetic alcohols such as 2-ethylbutanol, 2-methylpentanol, 2-ethyl-1-hexanol, hexanol, heptanol, 5-methylheptan-3-ol, octan-3-ol, trimethylnonyl alcohol, decanol, hexadecyl alcohol or alfols. Representative alfols are: alfol (810), alfol (911), alfol (1113), alfol (1014), alfol (1213) or alfol (1618).

Suitable alcohols are also unsaturated aliphatic alcohols, e.g. dodecenyl alcohol, hexadecenyl alcohol or oleyl alcohol.

The monoalcohols may also be employed individually or as mixtures.

The fatty acid of component A(2) may be saturated or unsaturated and is e.g. caprylic, capric, lauric, myristic, palmitic, coconut fatty, stearic, tallow fatty, arachidic, behenic, lignoceric or cerotinic acid, as well as decenoic, dodecenoic, tetradecenoic, hexadecenoic, hexadecenoic, oleic, eleostearic, linolic, linolenic, ricinoleic or arachidonic acid. Among these fatty acids, solid fatty acids such as coconut fatty acid acid, tallow fatty acid, palmitic acid, arachidic acid, behenic acid and, in particular, stearic acid, are preferred.

Component (a) is in particular an adduct of propylene oxide with a trihydric to hexahydric alkanol of 3 to 6 carbon atoms. This alkanol may be straight chain or branched and is, for example, glycerol, trimethylolethane, trimethylolpropane, erythritol, pentaerythritol, mannitol or sorbitol. Component (a) can be obtained e.g. by addition of about 2 to 20 moles, preferably 4 to 12 moles, of propylene oxide to 1 mole of the trihydric to hexahydric alcohol.

Adducts of 4 to 8 moles of propylene oxide with 1 mole of pentaerythritol have been found particularly suitable. Further suitable adducts are obtained e.g. by addition of 6 to 8 moles of propylene oxide to 1 mole of glycerol or sorbitol.

The propylene oxide adducts preferably have a molecular weight of 300 to 600.

The aliphatic dicarboxylic acids suitable for use as component (b) may be saturated or, preferably, ethylenically unsaturated. Examples of suitable aliphatic saturated dicarboxylic acids are succinic acid, glutaric acid, adipic acid, pimelic acid, suberic acid, azelaic acid or sebacic acid, or the anhydrides thereof, preferably succinic anhydride or glutaric anhydride.

Ethylenically unsaturated dicarboxylic acids are preferably fumaric acid, maleic acid or itaconic acid, as well as mesaconic acid, citraconic acid and methylenemalonic acid. The preferred anhydride of these acids is maleic anhydride, which is also the preferred component (b).

Component (c) is preferably a diol of formula

$$HO-(CH_2-CH_2-O)_m-H$$

wherein m is 1 to 40, preferably 3 to 35.

Examples of such diols are ethylene glycol, diethylene glycol or polyethylene glycols having an average molecular weight of 150 to 1800, preferably 170 to 1000. Further aliphatic diols may also be 1,3- or 1,2-propylene glycol or 1,5-pentanediol. Preferred condensates suitable as grafting substrates are obtained from the following components:

(a₁) an adduct of 4 to 12 moles of propylene oxide with a trihydric to hexahydric $C_3$–$C_6$alkanol, (b₁) an ethylenically unsaturated aliphatic dicarboxylic acid of 4 to 10 carbon atoms or the anhydride thereof, preferably maleic anhydride, (c₁) an aliphatic diol of formula

$$HO-(CH_2CH_2O)_{m_1}-H$$

wherein $m_1$ is an integer from 3 to 35, preferably a polyethylene glycol having an average molecular weight of 150 to 1500, in particular from 170 to 1000, and (d₁) an aliphatic monoalcohol of 12 to 18 carbon atoms, or (e) a $C_{12}$–$C_{22}$fatty acid, preferably coconut fatty acid, palmitic acid, tallow fatty acid, behenic acid or, most preferably, stearic acid.

Typical representatives of these condensates are:
1. 1 mole of the condensate of 1 mole of pentaerythritol and 4 to 8 moles of propylene oxide, 4 moles of maleic anhydride, 4 moles of polyethylene glycol having an average molecular weight of 400 to 600, and 4 moles of stearic acid,
2. 2 moles of the condensate of 1 mole of pentaerythritol and 4 to 8 moles of propylene oxide, 7 moles of maleic anhydride, 1 mole of polyethylene glycol having an average molecular weight of 1500, and 4 moles of alfol 1618,
3. 2 moles of the condensate of 1 mole of pentaerythritol and 4 to 8 moles of propylene oxide, 3 moles of maleic anhydride, 1 mole of polyethylene glycol having an average molecular weight of 1000, and 4 moles of stearic acid,
4. 2 moles of the condensate of 1 mole of pentaerythritol and 4 to 8 moles of propylene oxide, 7 moles of maleic anyhydride, 1 mole of polyethylene glycol having an average molecular weight of 600, and 4 moles of alfol 1618, 5. 2 moles of the condensate of 1 mole of pentaerythritol and 8 moles of propylene oxide, 7 moles of maleic anhydride, 1 mole of tetraethylene glycol, and 4 moles of alfol 1618.

The condensates are prepared by known methods. One method comprises reacting component (a) with components (b) and (c) and then further condensing (esterifying) the reaction product, depending on its structure, with a monoalcohol A(1) or with a fatty acid A(2). The reaction of component (a) with components (b) and (c) is conveniently carried out in the presence of a tertiary base such as pyridine or, preferably, tributylamine, and preferably in the temperature range from 80° to 120° C. The further reaction with component A (esterification) is conveniently carried out in the presence of an inert organic solvent and with the addition of an acid catalyst, in the temperature range from 80° to 150° C., while removing the water of condensation by azeotropic distillation. Sulfuric acid or p-toluenesulfonic acid may suitably be used as catalyst. Examples of suitable organic solvents are benzene, toluene or xylene.

If a fatty acid is used as component A, then the condensation can conveniently be carried out stepwise. For example, in a first step the polyol/propylene oxide adduct (component (a)) is reacted with the anhydride of the dicarboxylic acid (component (b)), desirably by heating to 80°-100° C. and preferably in the presence of a polymerisation inhibitor, e.g. di-tert-butyl-p-cresol, to the corresponding monoester of the dicarboxylic acid, and then, in a second step, further esterification is carried out with an ester of components ($A_2$) and (c), e.g. a polyethylene glycol monofatty acid ester, with the addition of a catalyst and, optionally, of the inert solvent.

Ethylenically unsaturated polymerisable monomers which may be suitably employed for grafting side chains onto the condensates cited above as main chains are monomers which contain hydrophilic groups as well as nitrogen-containing vinyl compounds. Eligible monomers containing hydrophilic groups may be acrylic acid, methacrylic acid, α-haloacrylic acid, 2-hydroxyethylacrylic acid, α-cyanoacrylic acid, crotonic acid and vinylacetic acid. Ethylenically unsaturated dicarboxylic acids are preferably fumaric acid, maleic acid or itaconic acid, as well as mesaconic acid, citraconic acid, glutaconic acid and methylenemalonic acid. The preferred anhydride of these acids is maleic anhydride. Suitable sulfonic acids are vinylsulfonic acid or 2-acrylamido-2-methylpropanesulfonic acid. Monocarboxylic acids containing 3 to 5 carbon atoms are preferred, in particular methacrylic acid and, most preferably, acrylic acid.

Examples of polymerisable nitrogen-containing vinyl compounds are unsubstituted or N-substituted amides or imides as well as nitriles of unsaturated aliphatic mono- or dicarboxylic acids, for example acrylamide, methacrylamide, maleimide, vinylidene cyanide, acrylonitrile or methacrylonitrile, and N-vinyl derivatives of nitrogen-containing 5- or 6-membered heterocycles, e.g. N-vinylpyrrolidone or vinyl pyridine.

The monomers required for grafting on the side chains may be employed singly or in admixture with each other. Preferred grafted monomers are acrylic acid and acrylamide.

Particularly interesting graft polymers of the invention comprise, as main chain, a condensate of 1 or 2 moles of the adduct of 4 to 8 moles of propylene oxide with 1 mole of pentaerythritol, 3 to 7 moles of maleic anhydride, 1 to 4 moles of polyethylene glycol having a molecular weight of 170 to 1000, and 4 moles of an aliphatic monoalcohol of 12 to 22 carbon atoms or of a fatty acid of 12 to 22 carbon atoms, and grafted acrylic acid or acrylamide as side chains.

Among these products, those graft polymers are preferred which comprise, as main chain, the condensate of 1 mole of the adduct of 1 mole of pentaerythritol and 4 to 8 moles of propylene oxide, 7 moles of maleic anhydride, 1 mole of tetraethylene glycol and 4 moles of a linear primary alkanol having 16 to 18 carbon atoms, especially alfol 1618.

The graft polymers of this invention preferably comprise 20 to 80% by weight of the condensate esterified with component A as main chain and 80 to 20% of grafted ethylenically unsaturated monomer, preferably acrylic acid or acrylamide, in the form of side chains.

Most preferably, the graft polymers comprise 25 to 75% by weight of the defined condensate as main chain and 75 to 25% by weight of grafted acrylic acid or acrylamide in the form of side chains.

The graft polymers of this invention are prepared by methods which are known per se, conveniently by combining (1) a condensate of (A) (1) an aliphatic monoalcohol of 6 to 22 carbon atoms or (2) a fatty acid of 8 to 22 carbon atoms with (B) the reaction product of (a) an adduct of propylene oxide with at least trihydric aliphatic alcohol of 3 to 10 carbon atoms, (b) an aliphatic dicarboxylic acid of 4 to 10 carbon atoms, or an anhydride thereof, and (c) an aliphatic diol having an average molecular weight of not more than 1800, with (2) an ethylenically unsaturated polymerisable monomer which preferably contains hydrophilic groups, e.g. an appropriate carboxylic acid or the anhydride thereof, or a sulfonic acid or amide, and polymerising the components in the presence of a catalyst, conveniently in the temperature range from 40° to 100° C.

The reaction products so obtained are mainly graft polymers in which the condensate forms the main chain onto individual carbon atoms of which the ethylenically unsaturated monomer, in particular acrylic acid or acrylamide, is grafted in the form of side chains.

It is convenient to use as catalysts free radical forming organic or, preferably, inorganic initiators. Suitable organic initiators for carrying out the radical polymerisation are for example symmetrical peroxide dicarbonates, butyl peroctoates, butyl perbenzoates, peracetates or peroxide dicarbamates. Suitable inorganic initiators are hydrogen peroxide, perborates, persulfates or peroxide sulfates. The preferred initiator or activator is potassium persulfate.

These catalysts may be may be employed in amounts of 0.05 to 5% by weight, preferably 0.05 to 2% by weight and, most preferably, 0.1 to 1% by weight, based on the starting materials.

It is preferred to carry out the graft polymerisation in an inert atmosphere, e.g. in a nitrogen atmosphere.

The polymers are obtained as solutions or as viscous solutions. Products suitable for use in practice having a solids content of e.g. 2 to 35% by weight, preferably 5 to 25% by weight, can be obtained by diluting the polymers or—depending on the nature of the grafted monomers—by dissolving them and diluting the solution so obtained with water. To preserve the aqueous solutions of the graft poplymers and/or to improve their storage stability, preservatives such as chloroacetamide, N- hydroxymethyl chloroacetamide, pentachlorophenolates, alkali metal nitrites, triethanolamine or, preferably, 4-hydroxyanisole, or also bactericides such as sodium azide or surface-active quaternary ammonium compounds containing one or two fatty alkyl radicals, may be added. Mixtures of these preservatives and antimicrobial compounds can also be added with advantage to the mixtures.

The preferred 5 to 25% solutions of the graft polymers have a viscosity at 25° C. of 500 to 40,000, preferably from 3000 to 25,000, mPa·s (milli-Pascal seconds).

The novel graft polymers have a wide range of utilities in textile application, e.g. pretreatment, dyeing or finishing and are used in particular as anticrease agents for dyeing cellulosic fibres, polyester fibres, synthetic polyamide fibres or blends of these fibres, as well as for dyeing wool or polyacrylonitrile fibres, as they counteract the adhesive strength of the textile material and so prevent creasing. They increase the rate of diffusion of the dye in the fibres and thereby increase the dye yield. In addition, they have foam inhibiting properties. However, they can also be used in wash liquors or pretreatment liquors such as bleaching liquors.

Accordingly, the present invention also relates to a process for dyeing or whitening textile material containing cellulosic fibres, natural or synthetic polyamide fibres, polyacrylonitrile fibres and, in particular, polyester fibres, with correspondingly suitable dyes and fluorescent whitening agents, which process comprises dyeing or whitening said textile material in the presence of the graft polymer of this invention.

The amounts in which the graft polymers are added to the dyebaths or whitening liquors vary from 1 to 10% by weight, preferably from 2 to 5% by weight, based on the weight of the textile material.

Suitable cellulosic material is that made of regenerated or, preferably, natural cellulose, for example viscose staple fibre, viscose rayon, hemp, linen, jute or, preferably, cotton.

Cellulosic fibre materials are normally dyed with substantive dyes, vat dyes, leuco-vat ester dyes or, preferably, with reactive dyes.

Suitable substantive dyes are the customary direct dyes, for example those listed under the heading "Direct Dyes" in the Colour Index, 3rd Edition (1971), Vol. 2, on pages 2005-2478.

The vat dyes are higher condensed and heterocyclic benzoquinones or naphthoquinones, sulfur dyes and, in particular, anthraquinoids or indigoid dyes. Examples of eligible vat dyes will be found in the Colour Index, 3rd Edition (1971), Vol. 3, under the headings "Sulfur Dyes" and "Vat Dyes" on pages 3469 to 3837.

The leuco vat ester dyes can be obtained e.g. from vat dyes of the indigo, anthraquinone or indanthrene series by reduction with e.g. iron powder and subsequent esterification with e.g. chlorosulfonic acid, and are listed in the Colour Index, 3rd Edition, 1971, Vol. 3, as "Solubilised Vat Dyes".

By reactive dyes are meant the customary dyes that form a covalent bond with cellulose, e.g. those listed under the heading "Reactive dyes" in the Colour Index, Vol. 3, 3rd Edition (1971), on pages 3391-3560, and in Vol. 6, revised 3rd edition (1975), on pages 6268-6345.

Suitable polyamide fibre materials, in particular textiles, which can be dyed in the presence of the novel graft polymers are e.g. those obtained from adipic acid and hexamethylenediamine (polyamide 6,6), from ε-caprolactam (polyamide 6), from ω-aminoundecanoic acid (polyamide 11), from ω-aminoenanthic acid (polyamide 7), from ω-aminopelargonic acid (polyamide 8), or from sebacic acid and hexamethylenediamine (polyamide 6,10).

Synthetic or natural polyamide fibre materials are normally dyed with anionic dyes.

The anionic dyes are e.g. salts of heavy metal-containing dyes or, preferably, of metal-free azomethine, monoazo, disazo or polyazo dyes including formazane dyes, as well as anthraquinone, xanthene, nitro, triphenylmethane, naphthoquinone-imine and phthalocyanine dyes. The anionic character of these dyes can be imparted by metal complexing alone and/or preferably by acid salt-forming substituents such as carboxylic acid groups, sulfuric acid ester and phosphoric acid ester groups, phosphonic acid groups or, preferably, sulfonic acid groups. These dyes can also contain in the molecule reactive groups which form a covalent bond with the polyamide. These last mentioned dyes preferably contain only one single sulfonic acid group and, may contain a further water-solubilising group such as the acid amide group or alkylsulfonyl group which, however, is not a salt-forming group.

Particularly interesting dyes are 1:1 or, preferably, 1:2 metal complex dyes. The 1:1 metal complex dyes preferably contain one or two sulfonic acid groups. As metal they contain a heavy metal atom, e.g. a copper, nickel or, preferably, chromium atom.

The 1:2 metal complex dyes contain, as central metal atom, a heavy metal atom, e.g. a cobalt or, preferably, a chromium atom. Attached to the central atom are two complexing components, at least one of which, but preferably each of which, is a dye molecule. Moreover, both dye molecules participating in the complexing can be identical or different. The 1:2 metal complex dyes can contain e.g. two azomethine molecules, one disazo and one monoazo dye molecule or, preferably, two monoazo dye molecules. The azo dye molecules can contain water-solubilising groups, e.g. acid amide, alkylsulfonyl or the above mentioned acid groups. Preferred metal complex dyes are 1:2 cobalt or 1:2 chromium complex dyes of monoazo dyes which contain acid amide or alkylsulfonyl groups or altogether a single sulfonic acid group. Mixtures of anionic dyes may also be used.

Suitable polyester fibre material which can be dyed or whitened in the presence of the graft polymer is e.g. material made from cellulose esters, such as cellulose 2½-acetate and cellulose triacetate fibres, and especially linear polyester fibres. Linear polyester fibres shall be understood as meaning synthetic fibres which are obtained e.g. by condensation of terephthalic acid with ethylene glycol or of isophthalic acid or terephthalic acid with 1,4-bis-(hydroxymethyl)cyclohexane, as well as copolymers of terephthalic acid and isophthalic acid and ethylene glycol. The linear polyester used up to now almost exclusively in the textile industry is that derived from terephthalic acid and ethylene glycol.

The disperse dyes to be used for dyeing polyester fibre materials, which dyes are soluble in water to only a very limited degree and are present in the dye liquor for the most part in the form of a fine dispersion, may belong to a wide range of dyestuff classes, for example to the acridone, azo, anthraquinone, coumarin, methine, perinone, naphthoquinone-imine, quinophthalone, styryl or nitro dyes. Mixtures of disperse dyes may also be used in the process of the invention.

Polyacrylonitrile fibres are preferably dyed with cationic dyes. Suitable cationic dyes are migrating as well as non-migrating dyes.

Suitable migrating cationic dyes are in particular those which carry a partially or completely delocalised positive charge and have a cation weight lower than 310, whose parachor is smaller than 750 and whose log P is smaller than 3.2. The parachor is calculated in accordance with the article by O. R. Quayle in Chem. Rev. 53, 439 (1953), and log P denotes the relative lipophilic value as calculated by C. Hanach et al., in J. Med. Chem. 16, 1207 (1973).

Non-migrating cationic dyes are in particular those dyes whose cation weight is greater than 310 and whose parachor is greater than 750.

The cationic migrating and non-migrating dyes may belong to various classes of dye. In particular, they comprise the customary salts, for example chlorides, sulfates or metal halides, for example zinc chloride double salts, of azo dyes such as monoazo or hydrazone dyes, anthraquinone, diphenylmethane, triphenylmethane, methine, azomethine dyes, coumarin, ketone-imine, cyanine, xanthene, azine, oxazine or thiazine dyes.

Mixtures of cationic dyes can also be used. It is especially preferred to use combinations of at least two or, preferably, three migrating or non-migrating cationic dyes for producing level dichromatic or trichromatic dyeings, for which utility mixtures of migrating and non-migrating cationic dyes may also be used.

The fibre materials can also be employed as blends with another or with other fibres, e.g. blends of polyacrylonitrile/polyester, polyamide/polyester, polyester/cotton, polyester/viscose, polyacrylonitrile/wool and polyester/wool.

Blends of polyester and cotton are normally dyed with combinations of disperse dyes and vat dyes, sulfur dyes, leuco vat ester dyes, direct dyes or reactive dyes, the polyester component being dyed beforehand, simultaneously or subsequently with disperse dyes.

Polyester/wool blends are preferably dyed in the practice of this invention with commercially available mixtures of anionic dyes and disperse dyes.

The textile material can be in different forms of presentation, with piece goods such as knitted or woven fabrics being preferred.

The novel polymers may also be used for whitening undyed natural or synthetic fibre materials with suitable fluorescent whitening agents which, depending on the material to be treated, may be dissolved or dispersed in water. The fluorescent whitening agents may belong to any class of such compounds. In particular they are coumarins, triazole coumarins, benzocoumarins, oxazines, pyrazines, pyrazolines, diphenyl pyrazolines, stilbenes, styryl stilbenes, triazolyl stilbenes, bisbenzoxazolyl ethylenes, stilbene bisbenzoxazoles, phenylstilbene oxazoles, thiophene bis-benzoxazoles, naphthalene bisbenzoxazoles, benzofuranes, benzimidazoles and naphthalimides. Mixtures of fluorescent whitening agents may also be used in the practice of this invention.

The amount of dye or fluorescent whitening agent to be added to the liquor depends on the desired colour strength. In general, amounts of 0.01 to 10% by weight, preferably 0.2 to 5% by weight, based on the weight of the textile material employed, are advantageous.

Depending on the textile material to be treated, the dyebaths or whitening baths may also contain, in addition to the dyes or fluorescent whitening agents and graft polymers of the invention, wool protecting agents, oligomer inhibitors, oxidants, antifoams, emulsifiers, levelling agents, retarders and, preferably, dispersants.

The dispersants are used in particular for obtaining a good dispersion of the disperse dyes. Suitable dispersants are those customarily employed in dyeing with disperse dyes. Preferred dispersants are sulfated or phosphated adducts of 15 to 100 moles of ethylene oxide or preferably propylene oxide with polyhydric aliphatic alcohols containing 2 to 6 carbon atoms, e.g. ethylene glycol, glycerol or pentaerythritol, or with amines containing 2 to 9 carbon atoms and at least two amino groups or one amino group and one hydroxyl group, as well as alkylsulfonates containing 10 to 20 carbon atoms in the alkyl chain, alkylbenzenesulfonates with straight or branched alkyl chain containing 8 to 20 carbon atoms, e.g. nonyl- or dodecylbenzenesulfonate, 1,3,5,7-tetramethyloctylbenzenesulfonate or octadecylbenzenesulfonate, and alkylnaphthalenesulfonates or sulfosuccinates, such as sodium dioctylsulfosuccinate.

Particularly suitable anionic dispersants are lignosulfonates, polyphosphates and, preferably, condensates of formaldehyde and aromatic sulfonic acids, formaldehyde and, optionally, mono- or bifunctional phenols, e.g. condensates of cresol, β-naphtholsulfonic acid and formaldehyde, of benzenesulfonic acid, formaldehyde and naphthalenesulfonic acid, of naphthalenesulfonic acid and formaldehyde, or of naphthalenesulfonic acid, dihydroxydiphenylsulfone and formaldehyde. The preferred anionic dispersant is the disodium salt of di-(6-sulfonaphth-2-yl)methane.

Mixtures of anionic dispersants may also be employed. The anionic dispersants will usually be in the form of their alkali metal salts, ammonium salts or amine salts. These dispersants are preferably employed in an amount of 0.1 to 5 g/l of treatment liquor.

Depending on the dye and substrate to be employed, the dyebaths or whitening baths may also contain, in addition to the above mentioned assistants, conventional assistants, preferably electrolytes such as salts, e.g. sodium sulfate, ammonium sulfate, sodium or ammonium phosphates or sodium or ammonium polyphosphates, metal chlorides or metal nitrates such as calcium chloride, magnesium chloride or calcium nitrate, ammonium acetate or sodium acetate and/or acids, e.g. mineral acids, such as sulfuric acid or phosphoric acid, or organic acids, preferably lower aliphatic carboxylic acids, such as formic acid, acetic acid or oxalic acid, as well as alkalies or alkali donors and chelating agents. The acids are used in particular for adjusting the pH value of the dyebaths employed in the invention. The pH value is ordinarily in the range from 4 to 6.5, preferably from 4.5 to 6.

When using reactive dyes, the liquors will normally contain fixation alkalies.

Examples of suitable alkaline compounds for fixing the reactive dyes are sodium carbonate, sodium bicarbonate, sodium hydroxide, disodium phosphate, trisodium phosphate, borax, aqueous ammonia or an alkali donor, e.g. sodium trichloroacetate. A particularly useful alkali is a mixture of water glass and a 30% aqueous solution of sodium hydroxide.

The pH of the alkaline dyebaths is normally in the range from 7.5 to 12.5, with the preferred range being from 8.5 to 11.5.

Dyeing or whitening is performed advantageously from an aqueous liquor by the exhaust method. The liquor to goods ratio can accordingly be chosen within a wide range, e.g. from 1:4 to 1:100, preferably from 1:6 to 1:50. The dyeing or whitening temperature is not less than 70° C. and is usually not higher than 140° C. Preferably it is in the range from 80° to 135° C.

Linear polyester fibres and cellulose triacetate fibres are preferably dyed by the high temperature process in closed and, advantageously, also in pressure-resistant apparatus in the temperature range above 100° C., preferably in the range from 110° to 135° C., and under normal or elevated pressure. Examples of suitable closed dyeing machines are circulating liquor machines such as cheese dyeing and beam dyeing machines, winch becks, jet dyeing or rotary dyeing machines, muff dyeing machines, paddles or jiggers. Cellulose 2½-acetate fibres are preferably dyed at temperatures from 80° to 85° C.

If the material to be dyed is cellulosic fibre material or synthetic polyamide material alone, dyeing is conveniently carried out in the temperature range from 20° to 106° C., preferably from 30° to 95° C., for cellulose fibres, and from 80° to 95° C. for polyamide fibres.

Polyester/cotton blends are preferably dyed in the temperature range above 106° C., most preferably in the range from 110° to 135° C. These blends can be dyed in the presence of a carrier or mixture of carriers which act as dyeing accelerators for dyeing the polyester component with disperse dyes.

The dyeing procedure can be carried out by treating the goods first briefly with the graft polymer and then dyeing them, or preferably by treating the goods simultaneously with the graft polymer and the dye.

The dyeings are aftertreated by cooling the dyebath to 40°-70° C., rinsing them with water and, if desired, effecting a reductive afterclear in alkaline medium in conventional manner. The dyeings are then once more rinsed and dried. When using carriers, the dyeings are conveniently subjected to a heat treatment, e.g. a thermosol treatment, in order to improve the lightfastness. This heat treatment is preferably carried out in the temperature range from 160° to 180° C. over 30 to 90 seconds. When dyeing the cellulose constituent with vat dyes, the goods are first treated with hydrosulfite at a pH of 7 to 12.5 and then with an oxidising agent, and finally given a washing off.

The process of the invention gives level and intense dyeings which are distinguished by good dye yields. In particular, level dyeings are obtained, and the material has a crease-resistance rating of 2–4 according to the Monsanto standard and has a level appearance and a pleasing soft handle. In addition, the fastness properties of the dyeings, e.g. lightfastness, crockfastness and wetfastness, are not impaired by the use of the graft polymer of the invention. Further, no troublesome foaming occurs when dyeing textile material in the presence of the composition of the invention.

In the following Preparatory and Application Examples, parts and percentages are by weight, unless otherwise indicated. The indicated amounts of dye refer to commercially available, i.e. diluted, product, and the indicated amounts of the componets of the composition refer to pure substance. Five-figure Colour Index (C.I.) numbers refer to the 3rd Edition of the Colour Index.

PREPARATORY EXAMPLES

Example 1

(A) 80.0 g of the adduct of propylene oxide and pentaerythritol (mol. wt. 400), 20.0 g of tetraethylene glycol, 68.2 g of maleic anhydride and 0.1 g of tributylamine are heated, under nitrogen, to 100° C. and kept at this temperature for 1 hour. Then 108.0 g of alfol 1618, 250 ml of toluene and 1 g of concentrated ($d_4^{20}$=1.83 g/cm$^3$) sulfuric acid are added, after which 12.6 ml of water are distilled off as an azeotrope. The reaction product is cooled to room temperature and then 6.0 g of sodium carbonate are added and the batch is stirred until homogeneous. After clarification, 266 g of condensate are obtained.

(B) 15.0 g of the condensate obtained in (A) are heated to 90° C. under nitrogen. Then a solution of 35.0 g of acrylic acid in 40 ml of deionised water and a solution of 0.15 g of potassium persulfate in 20 ml of deionised water are added dropwise separately over 30 minutes. After a reaction time of 1 hour, a solution of 0.1 g of potassium persulfate in 10 ml of deionised water is added and the polymerisation is allowed to go to completion for a further 3 hours. Then 4 ml of 30% sodium hydroxide solution are added and the batch is adjusted to a solids content of 20% by weight with 132 ml of deionised water. This solution has a viscosity of 8300 mPa·s at 25° C. The surface tension at 25° C. is 55.2 dyn/cm, measured in a 0.2% solution.

Example 2

A solution of 32.5 g of acrylic acid in 50 ml of deionised water and a solution of 0.15 g of potassium persulfate in 20 ml of deionised water are added dropwise separately, under nitrogen and over 45 minutes, to 32.5 g of the condensate obtained in Example (1A) in 40 ml of deionised water. In the course of the polymerisation, a total amount of 80 ml of deionised water is added in 20 ml portions in order to keep the batch stirrable. After a reaction time of 1 hour, a solution of 0.1 g of potassium persulfate in 10 ml of deionised water is added and the polymerisation is allowed to go to completion for a further 3 hours. The batch is stirred cold and then 4 ml of 30% sodium hydroxide solution are added. The reaction mass is adjusted to a solids content of 20% by weight with 132 ml of deionised water. This reaction mass has a viscosity of 580 mPa·s at 25° C. The surface tension at 25° C. is 54.3 dyn/cm, measured in a 0.2% solution.

Example 3

(A) 80 g of the adduct of propylene oxide and pentaerythritol (mol. wt. 400), 60 g of polyethylene glycol 600, 68.2 g of maleic anhydride and 0.1 g of tributylamine are heated to 100° C. under nitrogen, and the mixture is then allowed to react for 1 hour at this temperature. Then 108.0 g of alfol 1618, 150 ml of toluene and 1 g of concentrated sulfuric acid are added. While raising the temperature, 12 ml of water are distilled off as an azeotrope. The batch is stirred cold and, after addition of 6.0 g of sodium carbonate, stirred for 30 minutes and clarified, affording 307 g of a wax-like substance.

(B) A solution of 35.0 g of acrylic acid in 40 ml of deionised water and a solution of 0.15 g of potassium persulfate in 20 ml of deionised water are added dropwise separately at 98° C., under nitrogen and over 30 minutes, to 15.0 g of the condensate obtained in (A) and the mixture is polymerised for 1 hour. The batch is kept stirrable by adding a total amount of 70 ml of deionised water in 10 ml portions during the polymerisation. Then a solution of 0.1 g of potassium persulfate in 10 ml of deionised water is added and the polymerisation is allowed to go to completion for a further 3 hours. The batch is stirred cold and then 4 ml of 30% sodium hydroxide solution are added. A reaction mass with a solids content of 26.4% by weight is obtained. This reaction mass has a viscosity of 32250 mPa·s at 25° C. The surface tension at 25° C. is 54.9 dyn/cm, measured in a 0.2% solution.

Example 4

(A) 100.0 g of polyethylene glycol 1000, 19.6 g of maleic anhydride and 0.1 g of tributylamine are heated to 100° C. under nitrogen and allowed to react for 1 hour at this temperature. Then 80 g of the adduct of propylene oxide and pentaerythritol (mol. wt. 400) and 9.8 g of maleic anhydride are added and the mixture is heated for a further hour to 100° C. Then 110 g of stearic acid, 250 ml of toluene and 1.0 g of concentrated sulfuric acid ($d_4^{20} = 1.83$ g/cm$^3$) are added. While raising the temperature, 13 ml of water are distilled of as an azeotrope. The batch is cooled to room temperature and, after addition of 6.0 g of sodium carbonate, stirred for 30 minutes and clarified, affording 303 g of a clear yellowish brown liquid.

(B) 12 g of acrylamide, 8 g of the condensate obtained in (A), 80 ml of deionised water and 0.1 g of potassium persulfate are heated to 89° C. under nitrogen. After the onset of polymerisation, the mixture is kept for 4 hours at 80° C. From time to time a total amount of 60 ml of deionised water is added in 20 ml portions in order to keep the batch stirrable. When polymerisation is complete, 0.2 g of chloroacetamide and 0.2 g of 4-hydroxyanisole are added to stabilise the reaction product. A reaction mass with a solids content of 12.7% by weight is obtained. This solution has a viscosity of 37000 mPa·s measured at 25° C. The surface tension at 25° C. is 45 dyn/cm$^3$, measured in a 0.2% solution.

Example 5

7.0 g of the condensate obtained in Example (3A), 13 g of acrylamide, 80 ml of deionised water and 0.1 g of potassium persulfate are heated to 80° C. under nitrogen and polymerised for 1 hour at this temperature, while keeping the mixture stirrable by addition of a total amount of 100·ml of deionised water in two 50 ml portions. A solution of 0.0005 g of potassium persulfate in 20 ml of deionised water is then added dropwise and polymerisation is continued for 3 hours. Then 0.2 g of chloroacetamide and 0.2 g of 4-hydroxyanisole are added to stabilise the reaction product. The reaction mass has a solids content of 9.3% by weight. This reaction mass has a viscosity of 2040 mPa·s measured at 25° C. The surface tension at 25° C. is 51.4 dyn/cm, measured in a 0.2% solution.

Example 6

(A) 126.6 g of the adduct of propylene oxide and pentaerythritol (average mol. wt. 400), 125.2 g of maleic anhydride, and 0.6 g of 2,6-di-tert-butyl-p-cresol are heated to 90° C. under nitrogen. After a reaction time of 90 minutes, 868 g of polyethylene glycol 400 monostearate, 300 g of toluene and 5 g of concentrated sulfuric acid ($d_4^{20} = 1.83$ g/cm$^3$) are added. While raising the temperature to 160° C., 42 ml of water are distilled off as an azeotrope. The reaction product is then cooled to room temperature and 30 g of anhydrous sodium carbonate are added. The batch is stirred for 30 minutes and clarified, affording 1025 g of a wax-like substance that congeals at room temperature.

(B) 15 g of the condensate prepared in (A) and 20 ml of deionised water are heated to 90° C. under nitrogen. Then the separate and simultaneous dropwise addition is made over 45 minutes of a solution of 35 g of acrylic acid in 50 ml of deionised water and a solution of 0.15 g of potassium persulfate in 20 ml of deionised water. To keep the batch stirrable, a total amount of 160 ml of deionised water is added in 40 ml portions in the course of the polymerisation (1 hour). Then a further solution of 0.1 g of potassium persulfate in 10 ml of deionised water is added dropwise and the polymerisation is allowed to go to completion for 3 hours at 90° C. The batch is stirred cold and then 4 ml of 30% aqueous sodium hydroxide solution and 30 ml of deionised water are added. The reaction mass so obtained has a solids content of 14.9% by weight. This reaction mass has a viscosity of 2200 mPa·s at 25° C. The surface tension at 25° C. is 32.4 dyn/cm, measured in a 0.2% solution.

Example 7

25 g of the condensate prepared in Example (6A), 40.0 ml of deionised water and 2 ml of aqueous sodium hydroxide solution are heated to 90° C. under nitrogen. Then the separate and simultaneous dropwise addition of a solution of 25.0 g of acrylic acid in 70 ml of deionised water and 0.15 g of potassium persulfate in 20 ml of deionised water is made over 45 minutes. After a reaction time of 1 hour, a further solution of 10 g of potassium persulfate in 10 ml of deionised water is added dropwise, and the polymerisation is allowed to go to completion for a further 3 hours. Then 2.0 ml of 30% sodium hydroxide solution are added and the reaction mass is diluted with 50 ml of deionised water. The reaction product has a solids content of 21% by weight. This solution has a viscosity of 18000 mPa·s at 25° C. The surface tension at 25° C. is 37.6 dyn/cm, measured in a 0.2% solution.

APPLICATION EXAMPLES

Example 1

100 g of texturised polyester knitted fabric are dyed in 2.4 liters of water on a laboratory jet dyeing machine with the following ingredients:

2 g of a dye of the formula

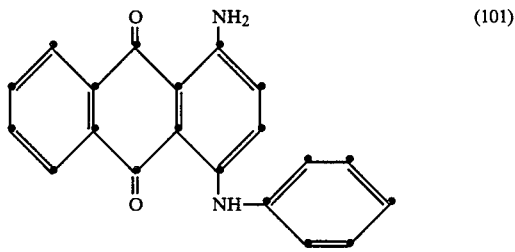

(101)

5 g of ammonium sulfate 1 g of the ammonium salt of the sulfated polyadduct of propylene oxide and glycerol with an average molecular weight of 3200, 3 g of the graft polymer of Example 1, and 0.2 g of 85% formic acid.

The above ingredients are first dissolved or dispersed in water and added to the dyebath at 70° C. The dyeing temperature is then raised over 60 minutes to 127° C. and the goods are dyed for a further 60 minutes at this temperature. The bath is then cooled to 20° C. over 4 minutes and the goods are then rinsed and dried. A level blue dyeing is obtained.

The dyed goods have a rating of 3 according to the Monsanto standard (test of crease resistance). The rating is only 1 without the addition of the graft polymer.

Example 2

100 kg of a polyester/wool (55–45) blended fabric are treated on a winch beck at 50° C. with a dye liquor which contains 1 kg of a 7:3 mixture of the dyes of formulae

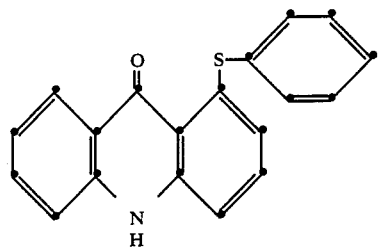
(102)

and

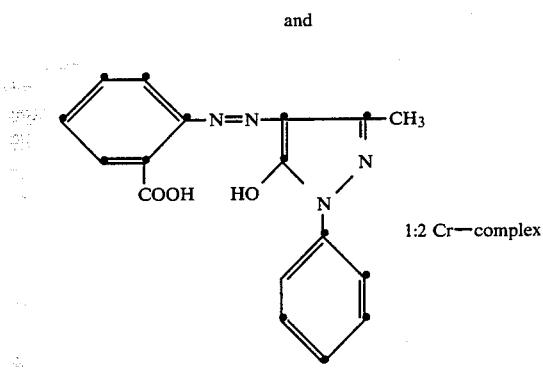
(103)
1:2 Cr—complex 0.8 kg of the sodium salt of ethylenediaminetetraacetic acid 4 kg of the reaction product of naphthalenesulfonic acid and formaldehyde 2 kg of an amophoteric fatty amine polyglycol ether sulfate and 3 kg of the graft polymer of Example 3 in 4000 liters of water.

The temperature is then raised to 107° C. over 30 minutes and the goods are dyed for 1 hour at this temperature. The bath is then cooled to 40° C. and the fabric is then rinsed and dried. A level, fast, yellow dyeing is obtained. The dyebath does not foam during the entire duration of the dyeing procedure.

According to the Monsanto standard, the dyed goods are rated 2–3.

Example 3

A high temperature dyeing machine which contains 100 kg of polyester/cotton (67:33) fabric in 3000 liters of water of 60° C., is initially charged with the following ingredients:

2 kg of a mixture of the dyes of formulae

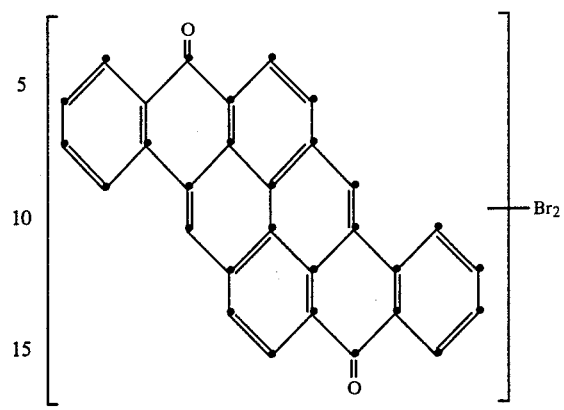
(104)

and

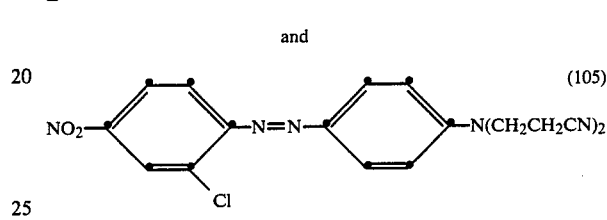
(105)

6 kg of ammonium sulfate and
0.6 kg of a fatty alkylbenzimidazole sulfonate.

Then 4 kg of the graft polymer of Example 4 are added. The pH of the dyebath is adjusted to 5 with 85% formic acid and the goods are allowed to circulate for 15 minutes. The temperature is then raised to 125° C. over 50 minutes and the goods are treated for 90 minutes at this temperature. The bath is then cooled to 70° C. and the following further ingredients are added in order to develop the vat dye:

9 kg of 30% sodium hydroxide solution
9 kg of 40% hydrosulfite and
5 kg of sodium chloride.

The goods are subsequently treated for 45 minutes at 70° C., then rinsed, oxidised with hydrogen peroxide, rinsed again, and dried.

The dyebath does not foam during the entire duration of the dyeing procedure. A level, fast, orange dyeing is obtained. According to the Monsanto standard, the rating is 3–4.

Example 4

100 g of texturised polyamie 6,6 knitted fabric are dyed on a laboratory jet dyeing machine in 2.4 liters of water containing the following ingredients:

1.6 g of a dye of formula

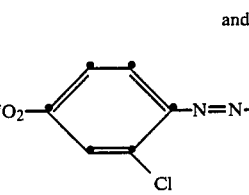
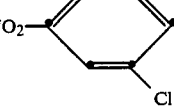
(106)

1 g of a condensate of 1 mole of fatty amine and 70 moles of ethylene oxide, 0.5 g of the 80% acetic acid,
1 g of ammonium acetate, and
3 g of the graft polymer of Example 1.

Dyeing is commenced at 40° C., the above ingredients are diluted with water in the order indicated above and added to the dyebath. the temperature of the dyebath is then raised to boiling temperature (96° C.) and dyeing is carried out for 40 minutes at this temperature. The bath is then cooled to 50° C. over 10 minutes and the goods are wrung out and dried. No troublesome foaming occurs during dyeing. The fabric is dyed in a level blue shade. The rating is 3 according to the Monsanto standard.

Example 5

100 g of cotton tricot are wetted on a winch beck in 4000 liters of water at 50° C. The following ingredients are then added:
3 kg of a dye of formula

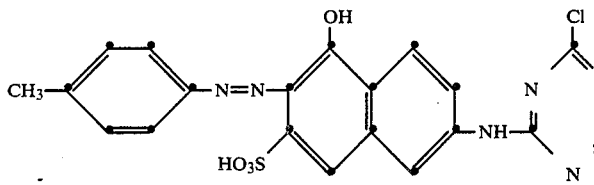 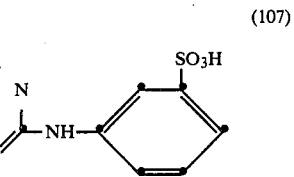

8 kg of sodium m-nitrobenzenesulfonate, and
3 kg of the graft polymer of Example 1.

After these ingredients have been homogenised, 160 kg of sodium chloride are added and the temperature is raised to 80° C. Then 12 kg of sodium hydroxide solution of 36° Bé are added.

After a running time of a further 45 minutes at 80° C., the goods are rinsed hot and cold and subsequently washed for 20 minutes at boiling temperature with 4 kg of the adduct of 9 moles of ethylene oxide and 1 mole of nonyl phenol and 3 kg of the graft polymer of Example 1 at a liquor to goods ratio of 1:40. The goods are subsequently rinsed once more and dried. No troublesome foaming occurs during the dyeing procedure. The dyed goods have a Monsanto standard rating of 4.

Example 6

100 g of woollen serge (180 g/m$^2$) are dyed in 2.4 liters of water on a laboratory jet dyeing machine with the following ingredients:

A 2 g of 80% acetic acid 5 g of sodium sulfate (anhydrous) 3 g of the graft polymer of Example 5
B 0.5 g of a dye of formula

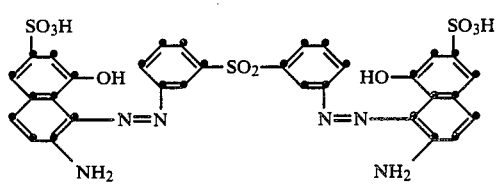

(108)

The ingredients A are first dissolved or dispersed in water and added to the dyebath at 50° C. After 5 minutes the dye (ingredient B) is added and the temperature is raised to 98° C. over 30 minutes and the goods are dyed at this temperature for 60 minutes. The bath is then cooled to 50° C. and the dyeing is rinsed and dried.

A fast, level, red dyeing with insignificant creasing of the fabric is obtained.

Example 7

10 g of a blend of 55 parts of polyacrylonitrile and 45 parts of wool are treated in a laboratory dyeing machine (AHIBA) at 50° C. with a liquor containing
0.3 g of ammonium sulfate
0.5 g of sodium sulfate
0.05 g of an amphoteric fatty amine polyglycol ether sulfate, and
0.3 g of the graft polymer of Example 5 in 400 ml of water and which has been adjusted to pH 2 with acetic acid.

The following ingredients are added after 5 minutes:

0.003% of the yellow dye of formula (109)

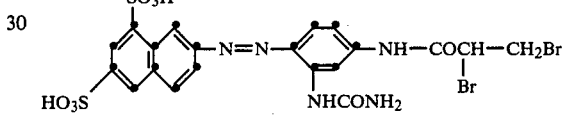

0.007% of the red dye of formula (110)

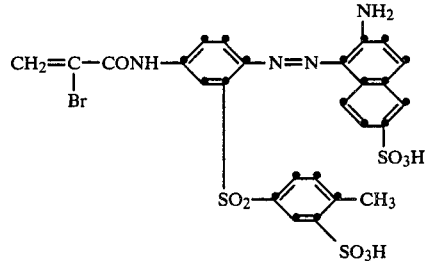

0.02% of the blue dye of formula (111)

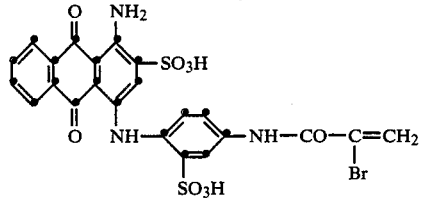

The temperature is then raised to 98° C. over 45 minutes and the fabric is kept for 15 minutes at this temperature. Then 0.02% of the dye of formula (112)

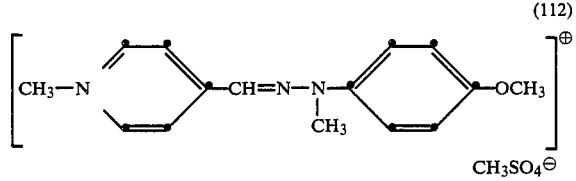

-continued 0.02% of the dye of formula

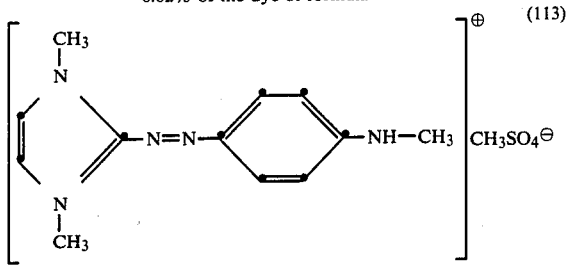 (113)

0.035% of the dye of formula

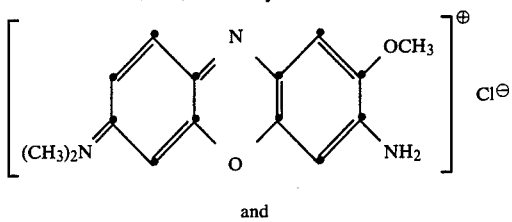 (114)

and 0.3% of the quaternary ammonium salt of formula

[cocosyl-N(CH$_3$)$_3$]$^\oplus$    Cl$^\ominus$    (115)

are added.

The dyebath is adjusted to pH 4 with acetic acid and dyeing is carried out for 45 minutes at 98° C.

The dyebath is then cooled to 60° C. and the goods are rinsed and dried. A fast, level grey dyeing is obtained.

Example 8

10 g of bleached and mercerised cotton tricot are treated at 20° C. in a dyeing machine (AHIBA) with a liquor containing 0.03% of a fluorescent whitening agent of formula

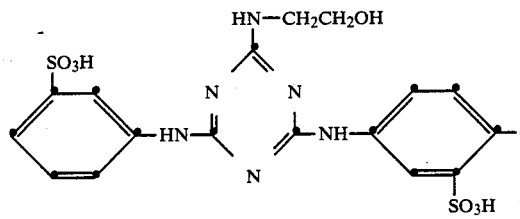 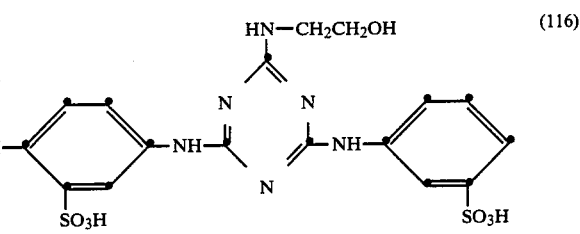 (116)

0.5% of sodium sulfate, and 0.3% of the graft polymer of Example 5 in 400 ml of water. The temperature is then raised to 80° C. over 30 minutes and the cotton is treated for 30 minutes at this temperature. The bath is then cooled to 50° C. and the goods are rinsed and dried. The whitened fabric is crease-free.

Example 9

100 kg of a polyester/cotton blend (1:1) are washed at 80° C. for 20 minutes on a hank scouring machine at a liquor to goods ratio of 1:20 with a liquor containing the following ingredients:

2.5 g/l of a 2:1 mixture of coconut fatty acid diethanolamide and sodium 1-benzyl-2-heptadecylbenzimidazoledisulfonate, 2 g/l of sodium carbonate and 2 g/l of the graft polymer of Example 2.

The fabric is then rinsed cold and warm. After it has been washed, the fabric is almost crease-free.

Example 10

Untreated cotton tricot is bleached at 90° C. for 15 minutes at a liquor to goods ratio of 1:40 in an aqueous liquor containing 2 g/l of sodium hydroxide (100%), 5 ml/l of a 35% aqueous solution of hydrogen peroxide, 1 g/l of the graft polymer of Example 1, and 1 g/l of an aqueous wetting agent containing 43% of sodium pentadecane-1-sulfonate, 14% of a C$_9$–C$_{11}$fatty alcohol polyglycol ether and 5% of 2-ethyl-1-hexanol, based on the total wetting agent.

The bleached substrate is then washed for 1 minute at the boil and 1 minute cold, neutralised and dried. The bleached substrate has an excellent degree of whiteness and is in addition crease-free.

What is claimed is:

1. A water-soluble or water-dispersible graft polymer which comprises (i) as main chain, a condensate of (A)(1) an aliphatic monoalcohol of 6 to 22 carbon atoms or (2) a fatty acid of 8 to 22 carbon atoms with (B) the reaction product of
   (a) an adduct of propylene oxide with a trihydric to hexahydric aliphatic alcohol of 3 to 10 carbon atoms,
   (b) an aliphatic dicarboxylic acid of 4 to 10 carbon atoms or the anhydride thereof, and
   (c) an aliphatic diol having an average molecular weight of not more than 1800, and
   (ii) grafted ethylenically unsaturated monomers in the form of side chains at individual carbon atoms of said condensate, wherein said monomers contain acid water-solubilizing groups.

2. A graft polymer according to claim 1 which comprises, as main chain, a condensate of
   2 to 4 moles of component A(1) or A(2),
   1 to 2 moles of component (a),
   2 to 8 moles of component (b), and
   1 to 4 moles of component (c).

3. A graft polymer according to claim 1 which comprises, as main chain, a condensate of
   (a$_1$) an adduct of 4 to 12 moles of propylene oxide with a trihydric to hexahydric C$_3$–C$_6$alkanol,
   (b$_1$) an ethylenically unsaturated aliphatic dicarboxylic acid of 4 to 10 carbon atoms or the anhydride thereof,
   (c$_1$) an aliphatic diol of formula HO—(CH$_2$CH$_2$O)$_{m1}$—H wherein m$_1$ is an integer from 3 to 35, and
   (d$_1$) either an aliphatic monoalcohol of 12 to 18 carbon atoms or
   (e) a C$_{12}$–C$_{22}$ fatty acid.

4. A graft polymer accordidng to claim 3, wherein the component (b$_1$) is maleic anhydride.

5. A graft polymer according to claim 1 which contains grafted acrylic acid or acrylamide in the form of side chains.

6. A graft polymer according to claim 1 which comprises (i) as main chain, a condensate of 1 or 2 moles of the adduct of 4 to 8 moles of propylene oxide with 1 mole of pentaerythritol, 3 to 7 moles of maleic anhydride, 1 to 4 moles of polyethylene glycol having a molecular weight of 170 to 1000, and 4 moles of an aliphatic monoalcohol of 12 to 22 carbon atoms or of a fatty acid of 12 to 22 carbon atoms, and (ii) grafted acrylic acid or acrylamide in the form of side chains.

7. A graft polymer according to claim 1 which comprises as main chain the condensate of 1 mole of the adduct of 1 mole of pentaerythritol and 4 to 8 moles of propylene oxide, 7 moles of maleic anhydride, 1 mole of tetraethylene glycol and 4 moles of a linear primary $C_{16}$–$C_{18}$alkanol.

8. A graft polymer according to claim 1, which comprises 20 to 80% by weight of condensate as main chain and 80 to 20% of grafted ethylenically unsaturated monomer in the form of side chains.

9. A graft polymer according to claim 8 which comprises 25 to 75% by weight of condensate as main chain and 75 to 25% by weight of grafted acrylic acid or acrylamide in the form of side chains.

10. An aqueous solution of emulsion which comprises a graft polymer as claimed in claim 1.

11. A process for dyeing or whitening textile material containing cellulosic fibres, natural or synthetic polyamide fibres, polyacrylonitrile fibres or polyester fibres, with correspondingly suitable dyes or fluorescent whitening agents, which process comprises dyeing or whitening said textile material in the presence of the graft polymer according to claim 1.

12. A process according to claim 11 for dyeing or whitening textile materials containing cellulosic fibres, synthetic polyamide fibres or polyester fibres.

13. A process according to claim 12, which comprises dyeing textile materials containing polyester fibres with disperse dyes in the temperature range from 70° to 140° C.

* * * * *